(12) United States Patent
Gelso et al.

(10) Patent No.: US 11,008,966 B2
(45) Date of Patent: May 18, 2021

(54) METHOD FOR DETERMINING A POSITION OF AT LEAST ONE ACTUATOR

(71) Applicant: VOLVO TRUCK CORPORATION, Gothenburg (SE)

(72) Inventors: Esteban Gelso, Gothenburg (SE); Johan Dahl, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 172 days.

(21) Appl. No.: 16/097,625

(22) PCT Filed: May 2, 2016

(86) PCT No.: PCT/EP2016/059762
§ 371 (c)(1),
(2) Date: Oct. 30, 2018

(87) PCT Pub. No.: WO2017/190760
PCT Pub. Date: Nov. 9, 2017

(65) Prior Publication Data
US 2019/0153970 A1    May 23, 2019

(51) Int. Cl.
*F02D 41/14* (2006.01)
*F02D 41/02* (2006.01)
(Continued)

(52) U.S. Cl.
CPC ......... *F02D 41/1406* (2013.01); *B60W 20/11* (2016.01); *F02D 41/0235* (2013.01);
(Continued)

(58) Field of Classification Search
CPC ............. F02D 41/0235; F02D 41/1406; F02D 2041/1412; F02D 2041/1422;
(Continued)

(56) References Cited

U.S. PATENT DOCUMENTS 7,328,577 B2 * 2/2008 Stewart ................... F02D 23/02
60/285
10,166,972 B2 * 1/2019 Fracchia ................ B60K 6/448
(Continued)

FOREIGN PATENT DOCUMENTS

CN      101660453 A    3/2010
CN      101939519 A    1/2011
(Continued)

OTHER PUBLICATIONS

Ahn, KR100551313, translation (Year: 2006).*
(Continued)

*Primary Examiner* — Hung Q Nguyen
*Assistant Examiner* — Mark L. Greene
(74) *Attorney, Agent, or Firm* — Venable LLP; Jeffri A. Kaminski

(57) ABSTRACT

A method is provided for determining a position of at least one actuator of an internal combustion engine arrangement, the method including the steps of: receiving parameter values for engine performance parameters of the internal combustion engine arrangement at a first point in time; predicting at least one engine performance parameter value at an at least one second, future point in time; and determining an actuator position for the at least one actuator by an optimization using the parameter values at the first point in time and at the at least one second point in time as input.

16 Claims, 5 Drawing Sheets

(51) Int. Cl.
*B60W 20/11* (2016.01)
*F01N 9/00* (2006.01)

(52) U.S. Cl.
CPC ............ *F01N 9/00* (2013.01); *F01N 2560/06* (2013.01); *F01N 2900/08* (2013.01); *F01N 2900/12* (2013.01); *F01N 2900/1602* (2013.01); *F02D 2041/1412* (2013.01); *F02D 2200/021* (2013.01); *F02D 2200/0625* (2013.01); *F02D 2200/0802* (2013.01); *F02D 2200/602* (2013.01); *F02D 2200/701* (2013.01); *F02D 2250/36* (2013.01)

(58) Field of Classification Search
CPC ..... F02D 2041/1423; F02D 2041/1437; F02D 2200/021; F02D 2200/0625; F02D 2200/0802; F02D 2200/602; F02D 2200/701; F02D 2250/36; F01N 2560/06; F01N 2900/08; F01N 2900/12; F01N 2900/1602; F01N 9/00; B60W 20/11; B60W 20/12; B60W 20/16
See application file for complete search history.

(56) References Cited

U.S. PATENT DOCUMENTS

| | | |
|---|---|---|
| 2006/0137346 A1 | 6/2006 | Stewart et al. |
| 2011/0301723 A1 | 12/2011 | Pekar et al. |
| 2013/0067894 A1 | 3/2013 | Stewart et al. |
| 2014/0316683 A1 | 10/2014 | Whitney et al. |
| 2015/0226135 A1 | 8/2015 | Geveci et al. |
| 2015/0275792 A1* | 10/2015 | Genslak .............. F02D 41/1445 60/274 |
| 2015/0275795 A1* | 10/2015 | Cygan, Jr. ........... F02D 41/0255 701/102 |
| 2015/0275796 A1* | 10/2015 | Pochner .................. F02D 41/04 701/104 |
| 2016/0363057 A1* | 12/2016 | Cygan, Jr. ........... F02D 13/0207 |
| 2017/0168466 A1* | 6/2017 | Sun ...................... G05B 13/026 |
| 2017/0298811 A1* | 10/2017 | Santillo ................ F02D 41/1401 |
| 2018/0372200 A1* | 12/2018 | Kumar ................... B60W 20/11 |

FOREIGN PATENT DOCUMENTS

| | | |
|---|---|---|
| CN | 104948319 A | 9/2015 |
| CN | 104948321 A | 9/2015 |
| DE | 102010008695 A1 | 8/2011 |
| DE | 102014216217 A1 | 2/2016 |
| EP | 1831516 B1 | 9/2010 |
| EP | 2262996 A1 | 12/2010 |
| EP | 2570638 A2 | 3/2013 |
| EP | 2735486 A1 | 5/2014 |
| EP | 2370682 B1 | 4/2018 |
| JP | 2005264930 A | 9/2005 |
| KR | 100551313 B1 * | 2/2006 |
| WO | 2016005414 A1 | 1/2016 |

OTHER PUBLICATIONS

International Search Report (dated Feb. 3, 2017) for corresponding International App. PCT/EP2016/059762.

International Search Report and Written Opinion dated Feb. 3, 2017 in corresponding International Application No. PCT/EP2016/059762, 11 pages.

Saerens et al., "Model Predictive Control of Automotive Powertrains—First Experimental Results", Proceedings of 47th IEEE Conference on Decision and Control, Dec. 9-11, 2008, pp. 5692-5697.

Borhan et al., Air Handling Control of a Diesel Engine with a Complex Dual-Loop EGR and VGT Air System using MPC, 2015 American Control Conference, Palmer House Hilton, Jul. 1-3, 2015, pp. 4509-4516.

China Office Action dated Mar. 3, 2021 in corresponding China Patent Application No. 201680085002.2, 26 pages.

* cited by examiner

METHOD FOR DETERMINING A POSITION OF AT LEAST ONE ACTUATOR

BACKGROUND AND SUMMARY

The present invention relates to a method for determining a position of at least one actuator of an internal combustion engine arrangement. The invention also relates to a corresponding system for determining a position of at least one actuator of an internal combustion engine. The invention is applicable on vehicles, in particularly low, medium and heavy duty vehicles commonly referred to as trucks. Although the invention will mainly be described in relation to a truck, it may also be applicable for other type of vehicles such as e.g. working machines, cars, etc.

In the field of vehicles, in particularly low-, medium- and heavy duty vehicles commonly referred to as trucks, performance and environmental requirements of the engines are continuously increasing due to e.g. local and regional emission legislations as well as a growing demand from the vehicle customers. Accordingly, there is often both a desire to increase the power of the engines as well as reducing fuel consumption and harmful emissions therefrom. These requirements are often in contradiction to each other, i.e. when increasing the power of the engine, the fuel consumption is naturally also increased, and vice versa. Thus, the engine system comprises a plurality of engine parameters and some engine parameters have to be sacrificed when controlling others. A control strategy is thus desired for controlling the engine parameters during operation of the vehicle.

US 2013/0067894 relates to a system for reducing environmentally harmful emissions from an internal combustion engine. An object of the system in US 2013/0067894 is to coordinate a control strategy for the engine in order to achieve maximum achievable performance in terms of NOx emissions and vehicle fuel economy. This is accomplished by coordinating control of the engine and an SCR device which, according to the description of US 2013/0067894, reduces NOx emissions to meet strict clean air regulations while also improving vehicle fuel efficiency.

Although US 2013/0067894 describes a system that improves vehicle engine parameters, there is still room for improvements in terms of e.g. improved control of the engine parameters.

It is desirable to provide a method for determining a position of at least one actuator of an internal combustion engine arrangement which at least partially overcomes the deficiencies of the prior art.

According to a first aspect of the present invention, there is provided a method for determining a position of at least one actuator of an internal combustion engine arrangement, the method comprising the steps of receiving parameter values for engine performance parameters of the internal combustion engine arrangement at a first point in time; predicting at least one engine performance parameter value at an at least one second, future point in time; and determining an actuator position for the at least one actuator by means of an optimization using the parameter values at the first point in time and at the at least one second point in time as input.

The wording "engine performance parameter" should in the following and throughout the description be interpreted as a parameter relating to the performance of the engine. Thus, an engine performance parameter affects the performance, in one way or the other, of the engine. As will be described further below, the engine performance parameter may, for example, be a parameter correlating to e.g. fuel consumption, NOx emissions, engine thermal power, air fuel ratio of oxygen content in the intake manifold, temperature of an engine after-treatment system, etc.

The at least one actuator may, for example, be associated with the specific engine performance parameter, as will also be described below. Hence, when determining an actuator position for the at least one actuator, the engine performance parameter is affected. When for example determining an actuator position of an actuator controlling fuel injection, the openness degree of this specific actuator affects the fuel consumption of the engine. The openness degree/position of this specific actuator may also affect other engine performance parameters as well, such e.g. NOx emissions and thermal power, etc.

An advantage of the present invention is that a prediction of future engine behavior is provided as an input when determining the actuator position for the at least one actuator. This will improve the optimization when controlling the actuators such that the respective parameters will have to sacrifice as little as possible which in turn will optimize fuel consumption and harmful emissions. By determining or predicting future engine behavior, transient control of the at least one actuator is improved by the method as the optimization will "know" future and upcoming engine behavior. The at least one second point in time can thus be composed of a plurality of future points in time such as e.g. a future time interval. The at least one second point in time may also in the following be referred to as the second point in time. It should be understood that the invention is not intended to, for example, reduce fuel consumption at all times, but rather to optimize the fuel consumption by taking into account other engine performance parameters. These other engine performance parameters are hence also optimized. Hereby, an optimization of the engine performance parameter values in relation to each other is achieved.

According to an example embodiment, the step of predicting the at least one engine performance parameter value at the at least one second point in time may be executed by the steps of predicting at least one of an engine torque and engine speed at the at least one second point in time; and determining the at least one engine performance parameter value at the at least one second point in time using the prediction of the at least one of engine torque and engine speed.

An advantage of predicting engine torque and/or engine speed at the at least one second, future point in time is that well defined input parameters for optimizing the position of the actuator is provided. Also, by means of a predicted engine torque and/or engine speed, it is possible to determine, either by means of e.g. calculations or further assumptions/predictions, the engine parameter values, which thus improves the accuracy of the optimization. Hereby, it is possible to prepare the engine for future working conditions at the second point in time.

According to an example embodiment, the actuator position may be determined by optimization of a weighted sum using the parameter values at the first point in time and the second point in time as input.

The weighted sum is beneficial since it provides for a relatively simple determination of which parameters to correlate, and how to correlate them, in order to achieve an optimization. By weighting the parameters, a respective weighting coefficient may be provided for each of the engine performance parameters desirable to obtain. The engine performance parameters are hence weighted such that the different engine performance parameters are comparable to each other to obtain a weighted sum.

According to an example embodiment, the actuator position of the at least one actuator may be associated with the at least one engine performance parameter. Hence, when e.g. increasing the exhaust thermal power of the internal combustion engine, the position of at least one actuator is affected.

According to an example embodiment, the method may further comprise the step of controlling the at least one actuator to be positioned in the actuator position.

According to an example embodiment, the method may further comprise the steps of receiving a signal indicative of an engine torque and/or engine speed at a previous point in time and at the first point in time; determining a driver pedal position of a driver pedal of the internal combustion engine arrangement; predicting at least one of the engine torque and engine speed at the at least one second point in time by means of the received signal and the determined driver pedal position; and determining the at least one engine performance parameter value at the at least one second point in time using the prediction of the at least one of engine torque and engine speed.

The wording "previous point in time" should be understood to mean a point in time that already occurred, i.e. a point in time consecutively before the first point in time.

An advantage is that an extrapolation of current and past usage of the internal combustion engine, i.e. current and past engine torque/engine speed, can be made in order to predict the engine torque and/or engine speed at the second point in time. Accordingly, a computational complexity of predicting the engine torque/engine speed at the second point in time can be kept relatively simple. The extrapolation is especially beneficial when predicting engine torque/engine speed at a second point in time which is quite close in time in comparison to the first, present point in time. Hence, the prediction horizon ahead is relatively short which is beneficial for fast dynamics when controlling e.g. engine pressures, mass flow rates, emission transient peaks, etc. Other advantages can also relate to improved air fuel ratio and turbocharger speed of the internal combustion engine arrangement.

According to an example embodiment, the method may further comprise the steps of receiving a signal indicative of road topology data ahead at the at least one second point in time from a global positioning system (GPS); predicting at least one of the engine torque and engine speed at the at least one second point in time by means of the received signal from the GPS; and determining the at least one engine performance parameter value at the at least one second point in time using the prediction of the at least one of engine torque and engine speed.

The prediction may thus be performed based on e.g. topology information, speed limit information, traffic situations, etc. which information is received from the GPS. This may be especially beneficial when predicting engine torque/engine speed at a second point in time which is quite far ahead from the first point in time. Hence, the prediction horizon ahead is relatively long which is beneficial for controlling temperatures of the internal combustion engine, i.e. slow dynamics downstream the engine for e.g. controlling the after-treatment system.

It should be noted that the short term prediction horizon and the long term prediction horizon may be used in combination with each other. Also, other alternatives than the GPS is of course conceivable, such as e.g. a digital map or pre-stored data for a specific road where the vehicle has been previously driven.

According to an example embodiment, the method may further comprise the steps of receiving a signal from an after-treatment system, the signal being indicative of a minimum and/or maximum allowable NOx level for said after-treatment system; and determining parameter values of the engine performance parameters at the at least one second point in time by using the received signal from the after-treatment system.

Hereby, the optimization always fulfils the requirements of NOx emissions. Also, it is advantageous to receive input from the after-treatment system so that the after-treatment system and the engine system are controlled in conjunction with each other and not individually. It is often desirable to avoid a too low NOx level in the after-treatment system. By doing so, ammonia slip can for example be avoided. It might thus be desirable to add extra NOx from the engine which at the same time will reduce fuel consumption for the internal combustion engine arrangement. Furthermore, maximum NOx levels often comes from national legislations and it is therefore desirable to control that NOx levels are below such maximum allowable limits. A further advantage is that fuel consumption and urea consumption are not optimized individually by receiving input signals from the after-treatment system.

According to an example embodiment, each of the engine performance parameters may be associated with a respective weighting parameter, the method comprising the step of determining a respective value for each of the weighting parameters for acquiring a minimization of a weighted sum of the parameter values at the at least one second point in time.

Hereby, a well defined equation system can be formulated which object is to receive a minimized calculation in order to optimize the position of the at least one actuator. An example of such equation is given below in Eq. 1.

$$\min_U(q_1 \times \text{Fuel consumption} + q_2 \times \text{NOx emissions} - q_3 \times \text{Thermal power}) \qquad \text{Eq. 1}$$

Where U is a vector of controllable variables correlating to the position of the at least one actuator, and $q_1$-$q_3$ are respective weighting parameters for the respective engine performance parameters. Other engine performance parameters are also conceivable, such as e.g. parameters correlating to soot emissions, regeneration of the after-treatment system, etc.

Hereby, each of the weighting parameter has an inverse unit in comparison to its respective engine performance parameter. For example, fuel consumption can be expressed in liters per kilometers. The respective weighting parameter, i.e. $q_1$ in the above example, is therefore expressed in kilometers per liter. Hereby, the result of the expression in Eq. 1 is not expressed in any units, i.e. the expression is "unit free".

According to an example embodiment, the at least one engine performance parameter may be a parameter correlating to at least one of fuel consumption, NOx emissions and thermal power of the internal combustion engine arrangement.

The wording "parameter correlating to" should be understood to mean that the parameter affects the specified engine performance parameter. Hence, the parameter must not be directed directly to fuel consumption but can rather be a parameter which affects the fuel consumption, etc. According to a non-limiting example, engine efficiency and pumping losses could be correlated to fuel consumption.

Other alternatives than the above described fuel consumption, NOx emissions and thermal power are of course conceivable. For example, the engine performance parameters may also relate to engine soot, where maximum and minimum requirements are taken into account, air fuel ratio or oxygen content in the intake manifold, exhaust temperature, etc.

According to an example embodiment, the step of determining the actuator position may be executed by means of a dynamic optimization solver.

A dynamic optimization solver is advantageous since it can control multiple inputs and can adapt during operation. Hence, the dynamic optimization solver can continuously solve the optimization problem and take predicted future engine behavior into account. The solver then either directly or indirectly controls the actuators according to the optimization.

According to an example embodiment, the dynamic optimization solver may be a Model Predictive Control (MPC) solver. An MPC is a control strategy that uses a model of a system in order to predict future outputs over a finite time horizon, and determines an optimal control sequence that optimizes a cost function. An MPC may be beneficial to use as it can represent the behavior of a relatively complex dynamic system and also provides a flexible framework for controlling a relatively complexed constrained dynamic system, i.e. the internal combustion engine system.

According to a second aspect, there is provided a system for determining a position of at least one actuator of an internal combustion engine arrangement, the system being configured to receive parameter values for engine performance parameters of the internal combustion engine arrangement at a first point in time; predict at least one engine performance parameter value at an at least one second, future point in time; and determine an actuator position for the at least one actuator by means of an optimization using the parameter values at the first point in time and at the at least one second point in time as input.

According to an example embodiment, the system may further comprise first subsystem configured to control at least one actuator of an internal combustion engine.

The first subsystem may comprise a dynamic optimization solver, such as the above described MPC solver, in order to control the at least one actuator of the internal combustion engine. The first subsystem may thus be a local system for the actuators of the engine.

According to an example embodiment, the system may further comprise a second subsystem configured to control at least one actuator of an engine after-treatment system.

Hereby, a separate subsystem controls the actuators of the engine after-treatment system which can simplify the respective systems as control functions are separated and does not have to be performed by a single system.

According to an example embodiment, the system may further comprise a third subsystem configured to predict at least one of an engine torque and an engine speed of the internal combustion engine arrangement at the at least one second point in time.

An advantage of using the third subsystem to predict engine torque and/or engine speed is that a hierarchical higher order system is provided. This third subsystem may comprise a dynamic optimization solver and can be connected to the first and second subsystems in such a way as to receive input to the solver from the respective first and second subsystems. Hence, the dynamic optimization solver of the third subsystem can predict engine torque and/or engine speed and by means of input from e.g. the first and second subsystems execute an optimization of its inputs for delivery to the first and second subsystems for use when controlling the respective actuators. Further, since not only models of the first subsystem, which may be the engine system, but also of the second subsystem, e.g. the after-treatment system, is included, a better coordination of both subsystems could be achieved, and hence, a more accurate optimization of the performance parameters such as e.g. fuel consumption and after-treatment fluid consumption.

According to an example embodiment, the first subsystem may be further configured to receive predicted engine torque and/or engine speed at the at least one second point in time from the third subsystem; and determine parameter values for the engine performance parameters at the at least one second point in time by using the prediction of the at least one of engine torque and engine speed received from the third subsystem.

As described above, the third subsystem may be a hierarchical higher system and by allowing the third subsystem to predict the engine torque/engine speed at the second point in time, the third subsystem may provide input predictions and set points to the first subsystem which reduces the computational effort needed by the first subsystem.

According to an example embodiment, the second subsystem may be configured to receive a signal indicative of a temperature level of an engine after-treatment system at the first point in time; and provide said signal indicative of the temperature level to the third subsystem.

Hereby, the third subsystem beneficially receives input values to its dynamic optimization solver also from the second subsystem.

According to an example embodiment, the third subsystem may be configured to determine a minimum and/or maximum allowable NOx-level for the engine after-treatment system by means of the received signal indicative of the temperature level and the prediction of engine torque and/or engine speed at the at least one second point in time; and provide said determined maximum allowable NOx-level to said first subsystem.

Further effects and features of the second aspect are largely analogous to those described above in relation to the first aspect of the present invention.

According to a third aspect, there is provided a computer program comprising program code means for performing any of the steps of the example embodiments described above in relation to the first aspect when the program is run on a computer.

According to a fourth aspect, there is provided a computer readable medium carrying a computer program comprising program means for performing any of the steps of the example embodiments described above in relation to the first aspect said program means is run on a computer.

According to a fifth aspect, there is provided a vehicle comprising a system according to any of the example embodiments described above in relation to the second aspect.

Effects and features of the third, fourth and fifth aspects of the present invention are largely analogous to those described above in relation to the first and second aspects.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of a exemplary embodiments of the present invention, wherein.

DETAILED DESCRIPTION

Figure 1:
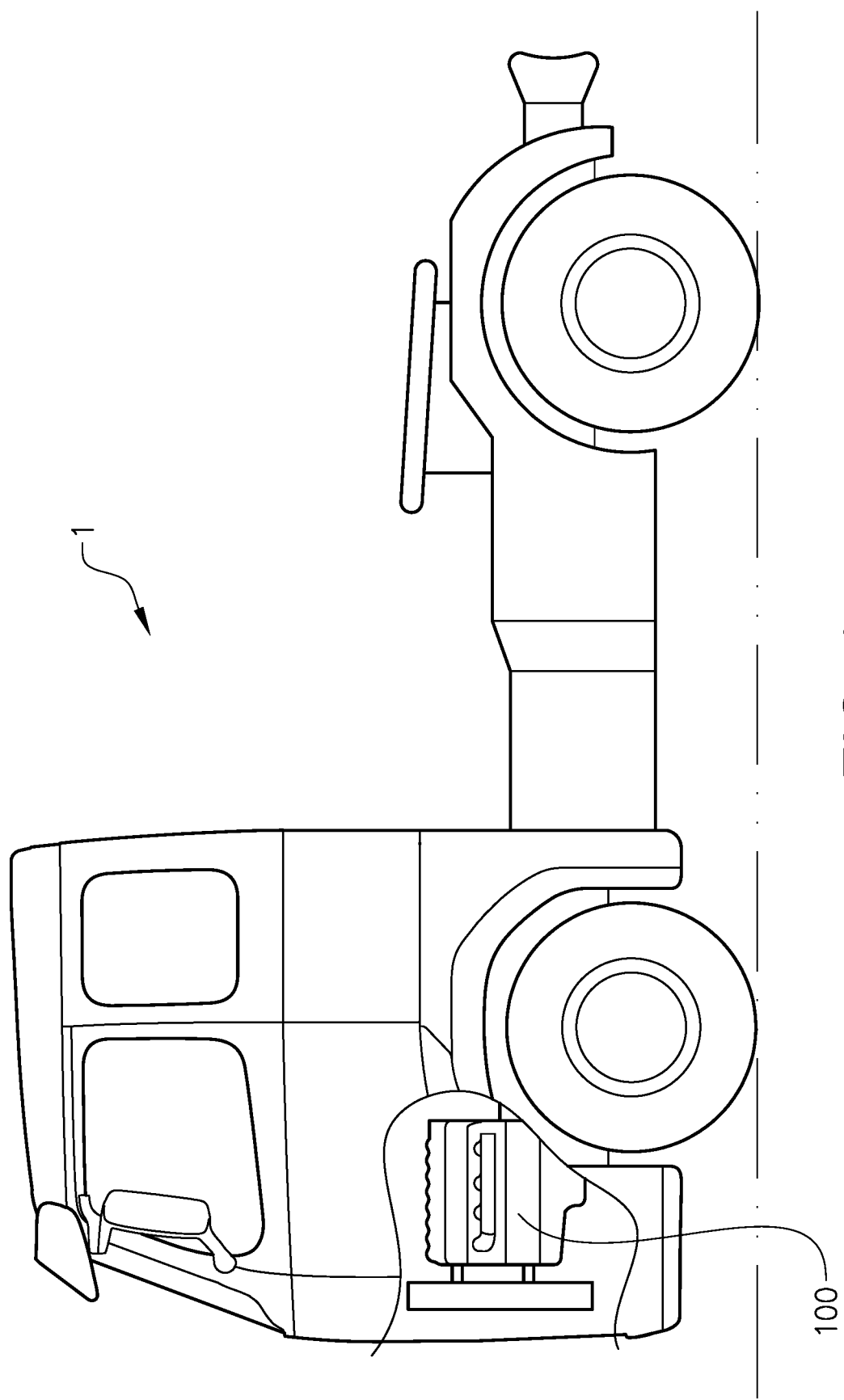
FIG. 1 is a side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 comprising an internal combustion engine arrangement 100. In detail, the vehicle 1 is provided with a system (depicted in detail in FIGS. 2 and 3) for determining a position of at least one actuator according to an example embodiment of the present invention. The vehicle 1 depicted in FIG. 1 is a heavy duty vehicle, here in the form of a truck, for which the inventive system, which will be described further below, is particularly suitable for.

Figure 2:
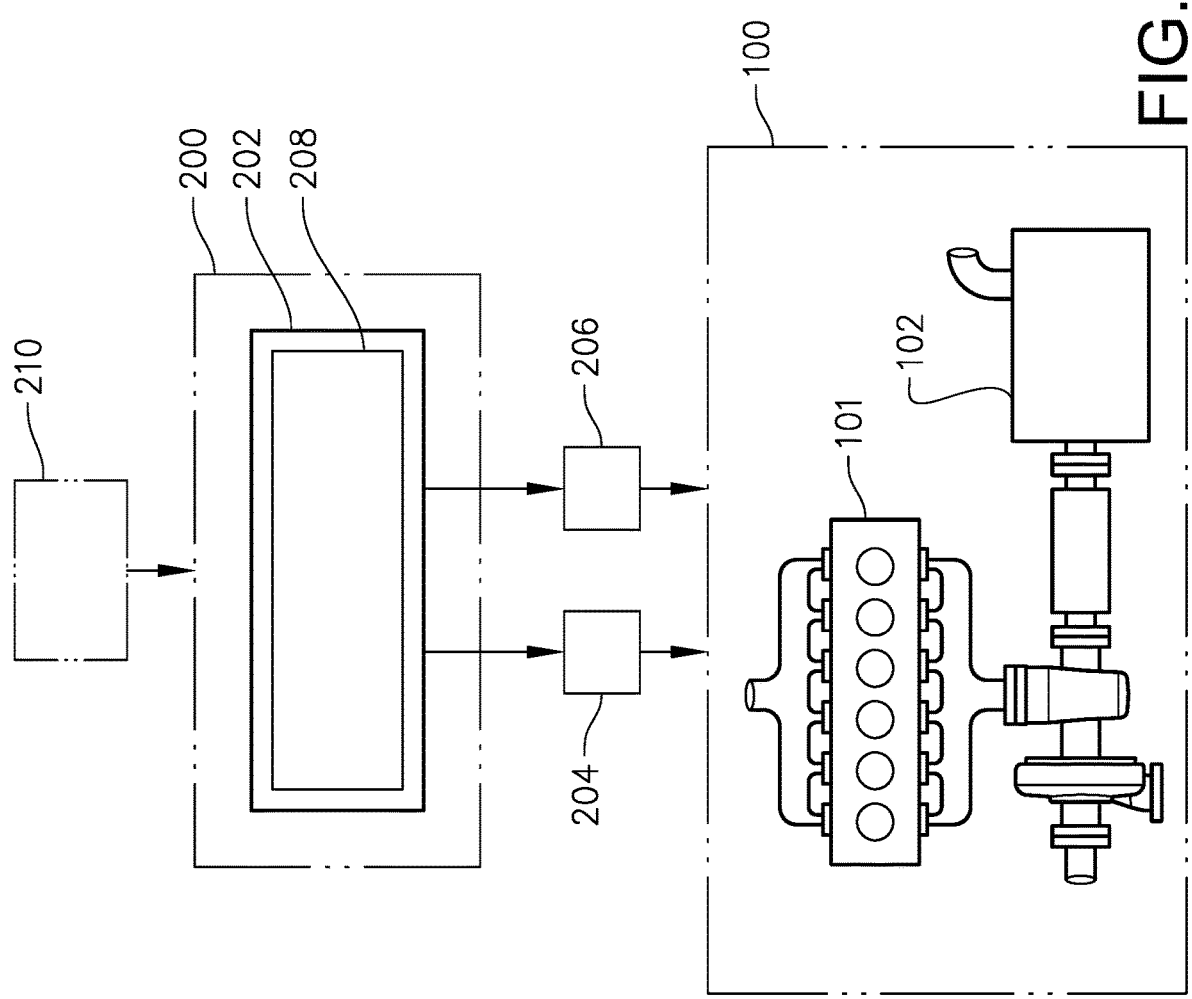
FIG. 2 is a schematic illustration of a system according to an example embodiment of the present invention.

Referring now to FIG. 2, which is a schematic illustration of a system 200 according to an example embodiment. The system 200 depicted in FIG. 2 comprises a first subsystem 202, which in the following will be referred to as an engine controller. The engine controller 202 is connected to actuators 204, 206 of the internal combustion engine arrangement 100. The internal combustion engine arrangement 100 comprises, in the illustrated embodiment, an internal combustion engine 101 and an exhaust after-treatment system (EATS) 102. In the example embodiment depicted in FIG. 2, only a first 204 and a second 206 actuator is depicted for simplicity of understanding. It should however be readily understood that the engine controller 202 can be connected to a plurality of actuators of the internal combustion engine arrangement 100. The actuators 204, 206 can for example include engine exhaust gas recirculation (EGR) valves, variable geometry turbine (VGT) valves, inlet valve throttles, etc. Thus, the actuators 204, 206 may control, for example, valves of the internal combustion engine 101 as well as valves of the EATS 102.

Furthermore, the engine controller 202 comprises a dynamic optimization solver, which in the following will be described in relation to a Model Predictive Control (MPC) solver 208. The invention should however not be construed as limited to an MPC solver 208 since other types of dynamic optimization solvers are conceivable, such as e.g. predictive controllers based on linear matrix inequalities, etc. The MPC solver 208 is a control solver that uses a model of the internal combustion engine system 100 in order to predict future outputs over a finite time horizon. By means of the MPC solver 208, future positions of the actuators 204, 206 can be determined by optimizing a mathematical function set by the MPC solver 208. Hereby, the position of the respective actuators 204, 206 is controlled for optimized driving condition of the vehicle 1.

The engine controller 202, and thus the MPC solver 208, receives various engine performance parameters in order to solve the optimization of the mathematical function. The engine performance parameters can be received from various vehicle systems 210 depending on the specific parameter. It should thus be understood that the various engine performance parameters can be received from respective sensors (not shown) of the vehicle 1. The engine performance parameters can also be received from a third subsystem as will be described further below in relation to the description of FIG. 3. The engine performance parameters may be parameters correlating to e.g. fuel consumption, NOx emissions, engine thermal power, air fuel ratio of oxygen content in the intake manifold, temperature of an engine after-treatment system, etc.

Furthermore, the MPC solver 208 receives parameter values for various engine performance parameters at a first, present point in time. Hereby, input values for the initial starting position for the MPC solver 208 are acquired/provided. The MPC solver 208 thereafter predicts the engine performance parameter values at a second, future point in time, or future points in time. As an example, the predictions of the engine performance parameters at the second point in time can be based on a prediction of engine speed and/or engine torque at the second point in time. Further details of how to predict engine speed and/or engine torque at the second point in time will be given below in relation to FIG. 4. Accordingly, the first point in time relates to a current condition and the second point in time relates to a future, upcoming point in time, or points in time, which will take place after the first point in time.

To describe how the MPC solver 208 optimizes the parameter values in order to determine the position of the actuators 204, 206 at the second point in time, the following example will be made in relation to engine performance parameters in terms of fuel consumption, NOx emissions and thermal power of the internal combustion engine.

Firstly, each of the fuel consumption, NOx emissions and thermal power of the internal combustion engine is predicted for the second point(s) in time. This can be made by predicting, preferably by calculation using e.g. engine performance parameters at the first point in time, the engine speed and/or engine torque at the second point in time and determine the fuel consumption, NOx emission and thermal power that will be provided/needed by such predicted engine speed and/or engine torque. The equations given in Eq. 2 and Eq. 3 below could, as an example, be used for calculation of the respective engine performance parameters at a point in time referred to as k:

$$\dot{x}(k+1) = A \cdot x(k) + B_c \cdot u_c(k) + B_d \cdot u_d(k) \qquad \text{Eq.2}$$

$$y(k) = C \cdot x(k) + D_c \cdot u_c(k) + D_d \cdot u_d(k) \qquad \text{Eq.3}$$

Where $y(k)$ is the predicted engine performance parameter at time(k), $x(k)$ is a vector comprising various variables relating to the state of the engine and $\dot{x}$ is the time derivative thereof, $u_c(k)$ are the controllable variables such as the positions of the different actuators 204, 206, and $u_d(k)$ are predicted engine speed and engine torque at time(k). The vector ud(k) can also be described as defined by Eq. 4 below. A, Bc, Bd, C, Dc and Dd are respective constant and/or time-varying parameters.

$$u_d(k)=[n_e(k)u_\delta(k)]^T \quad \text{Eq. 4}$$

Where ne(k) is the predicted engine speed at time(k) and $u_\delta(k)$ corresponds to the predicted engine torque.

With the calculation of the predicted engine performance parameter y(k) in Eq. 3, the optimization problem defined by Eq. 5 below can be formulated. Eq. 3 thus calculates an y(k) for the fuel consumption, NOx-emission and thermal power of the internal combustion engine, respectively.

$$\min_U(q_1 \times \text{Fuel consumption} + q_2 \times \text{NO}x \text{ emissions} - q_3 \times \text{Thermal power}) \quad \text{Eq. 5}$$

Where U is a vector of controllable variables corresponding to the position of the actuators 204, 206 and q1, q2, and q3 are weighting parameters for the fuel consumption, NOx emission and thermal power, respectively. The optimization problem in Eq. 5 can be further detailed over the finite time horizon by means of the expression in Eq. 6 below.

$$\min_U q_1 \sum_{j=0}^{N_1-1} y_1(k+j+1) + q_2 \sum_{j=0}^{N_1-1} y_2(k+j+1) - q_3 \sum_{j=0}^{N_1-1} y_3(k+j+1) \quad \text{Eq. 6}$$

where N1 is the prediction horizon, i.e. up to the second point in time. Hereby, the optimization is performed for a plurality of time periods from the first, present point in time until the second, future point in time.

The optimization problem stated in Eq. 5 and Eq. 6 may thus result in that the fuel consumption must be increased for compensation of an increased thermal power of the internal combustion engine 101, etc.

The optimization problem may also take account for various constraints, such as maximum and minimum temperature levels of the exhaust gases, range values of NOx emissions, minimum allowable air fuel ratio, limits on the actuators themselves, etc. By using these constraints to the MPC solver 208, the optimization can be even further improved. The MPC solver 208 can also receive input values from the engine after-treatment system 102. Such input values can relate to e.g. temperature levels of the engine after-treatment system 102 at the first point in time, and/or desired temperature levels of the engine after-treatment system 102 at the second point in time.

Figure 3:
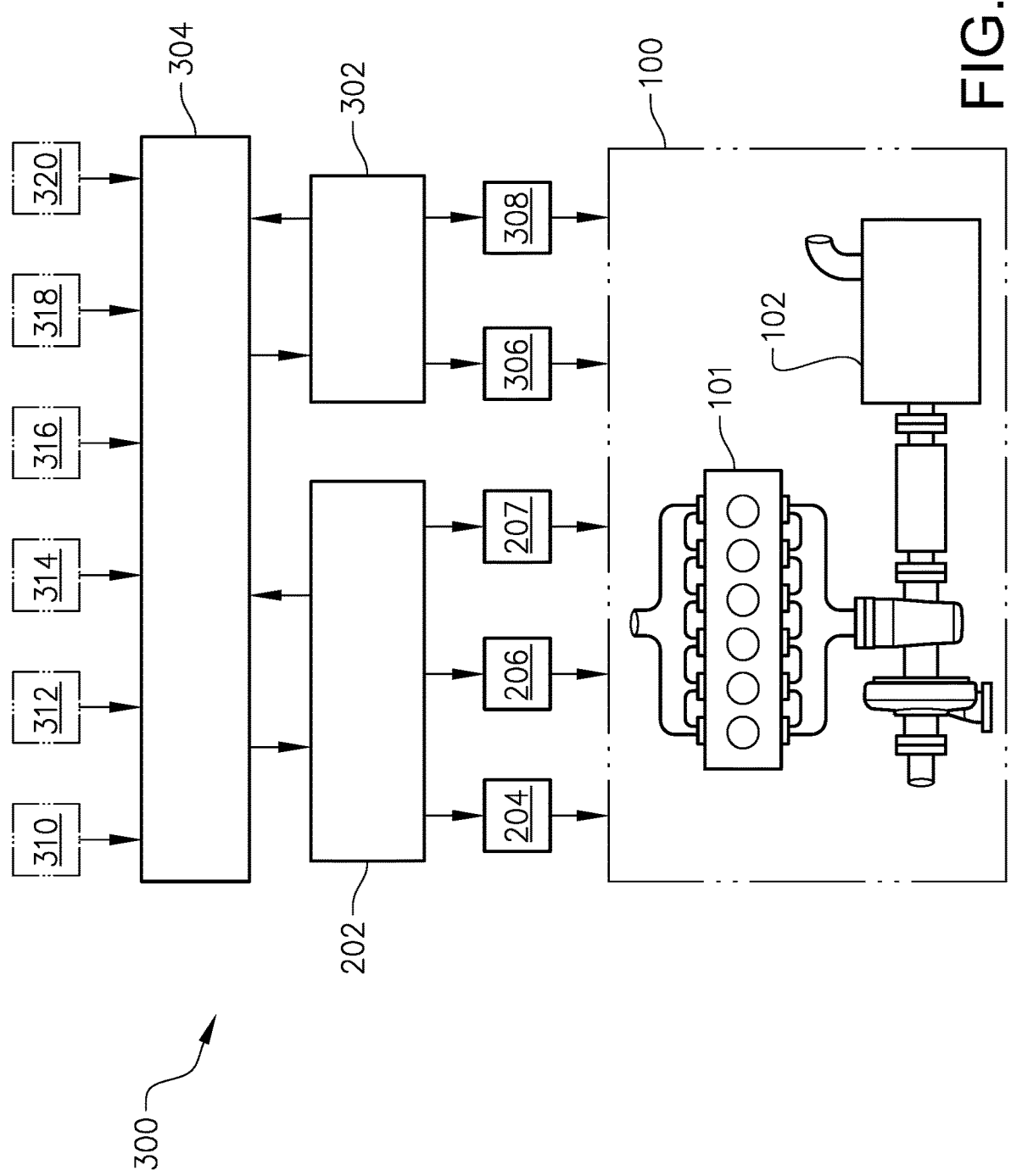
FIG. 3 is a schematic illustration of a system according to another example embodiment of the present invention.

Reference is now made to FIG. 3 which illustrates another example embodiment of a system 300 for determining a position of at least one actuator. The system 300 in FIG. 3 comprises the above described first subsystem 202, also referred to as the engine controller, a second subsystem 302, also referred to as an exhaust after-treatment controller, and a third subsystem 304, also referred to as an engine and EATS coordinator.

The engine controller 202 in FIG. 3 functions similarly to the above description in relation to FIG. 2. Hence, the engine controller 202 comprises a dynamic optimization solver, preferably an MPC solver for optimizing engine performance parameter values in order to determine a respective actuator position for the actuators 204, 206, 207 of the internal combustion engine arrangement 100.

The exhaust after-treatment controller 302 is arranged to control actuators 306, 308 of the engine after-treatment system 102. The actuators 306, 308 of the engine after-treatment system 102 may be arranged to control e.g. a urea flow and HC injection into the engine after-treatment system 102, etc.

The engine and EATS coordinator 304 is arranged as an upper level controller for the engine controller 202 and the exhaust after-treatment controller 302. The engine and EATS coordinator 304 receives control signals from the engine controller 202 and the exhaust after-treatment controller 302, as well as from different ambient vehicle systems 310, 312, 314, 316, 318, 320, 322. Hereby, the engine and EATS coordinator 304 acquires a more comprehensive view of the complete system in comparison to e.g. the engine controller 202 itself. Furthermore, the engine and EATS coordinator 304 may also comprise a dynamic optimization solver, such as an MPC solver. Hereby, the MPC solver of the engine and EATS coordinator 304 can optimize input parameters to the engine controller 202 and the exhaust after-treatment controller 302, respectively. In particular, the MPC solver of the engine and EATS coordinator 304 can, for example, optimize fuel consumption of the engine as well as the exhaust after-treatment system, urea consumption in the exhaust after-treatment system, etc.

As described above, the engine and EATS coordinator 304 can receive control signals from ambient vehicle systems. These system can, for example, comprise a system 310 arranged to provide a signal indicating a maximum allowable NOx level in the tailpipe of the vehicle, a system 312 arranged to provide a signal indicative of torque demand from e.g. vehicle auxiliaries, a system 314 arranged to provide a signal indicative of upcoming, future road information. Such road information may relate to road topology, location of traffic junctions, altitude, planned stops for the vehicle, etc. Further ambient vehicle systems may be a system 316 arranged to provide a signal indicative of traffic information ahead, such as e.g. dynamic traffic signs, emission zones, traffic cues, vehicle-to-vehicle communication, etc., or a system 318 arranged provide signal indicative of present weather conditions or predicted weather forecasts, or a system 320 proving a signal indicative of on-board diagnostics of the vehicle, etc.

The control signals received by the engine and EATS coordinator 304 from the engine controller 202 can relate to e.g. present states of the internal combustion engine 101, such as e.g. present engine speed, engine torque, etc. The control signals received by the engine and EATS coordinator 304 from the exhaust after-treatment controller 302 can relate to the present state of the exhaust after-treatment system 102, such as e.g. a present temperature level of the exhaust after-treatment system 102, etc.

By means of the control signals received by the engine and EATS coordinator 304, the MPC solver therein can provide an optimization algorithm in order to provide control signals to the exhaust after-treatment controller 302 as well as to the engine controller 202.

The control signal provided from the engine and EATS coordinator 304 to the engine controller 202 can be arranged as input signals to the MPC solver of the engine controller 202. The signals can, for example, be indicative of predicted engine speed and/or engine torque at the second, future point in time, maximum allowable limit values, such as e.g. NOx limit values, exhaust temperature limits, soot limits, etc., and/or set point values. Such set point values can relate to e.g. max/min NOx limits, engine exhaust temperature, etc.

The control signal provided from the engine and EATS coordinator 304 to the exhaust after-treatment controller 302 can be arranged as control signals for determining the position of the respective actuators 306, 308 of the exhaust after-treatment system 102. Thus, by means of the MPC solver of the engine and EATS coordinator 304, set point values can be delivered to the exhaust after-treatment controller 302 which in turn calculates an actuator position of the respective actuators 306, 308 of the exhaust after-treatment system 102.

Figure 4:
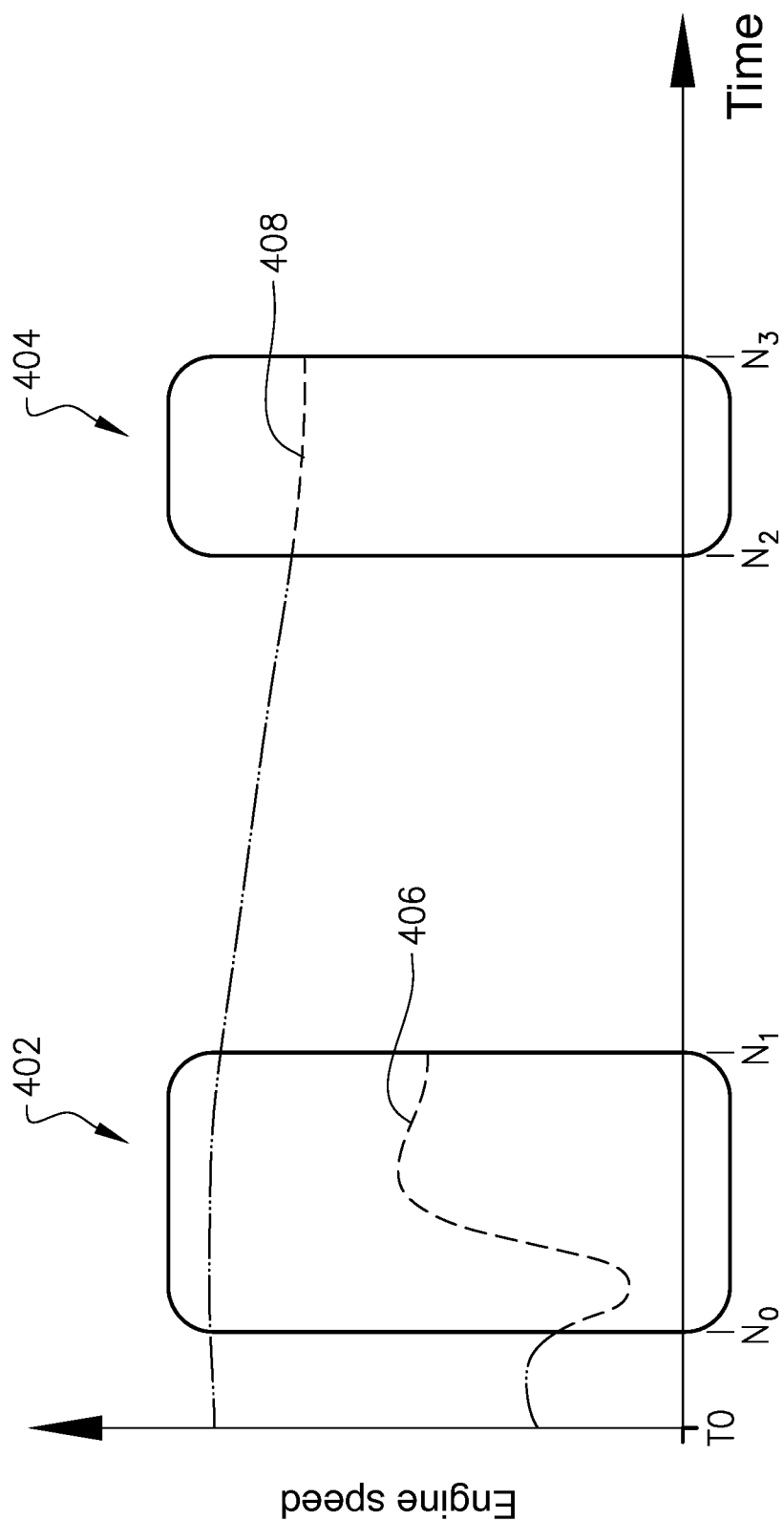
FIG. 4 is a graph illustrating example embodiments of prediction horizons at future points in time.

Reference is now made to FIG. 4 which is a graph illustrating different prediction horizons at future points in time. In detail, FIG. 4 illustrates a short term prediction horizon 402 and a long term prediction horizon 404. The short term prediction horizon 402 illustrates a prediction of the variation of engine speed 406 between future points in time denoted as N0 and N1, while the long term prediction horizon 404 illustrates a prediction of the variation of engine speed 408 between future points in time denoted as N2 and N3. Although FIG. 4 illustrates the predicted variations in engine speed, a similar graph may be provided for the predicted variations in engine torque as well.

The short term prediction horizon 402 between N0 and N1 can relate to fast dynamics of the engine speed that is predicted to take place in a near future compared to the first, present point in time T0. The variations in engine speed 406 between N0 and N1 can be predicted by determining a current and a previous usage of the engine, i.e. previous engine speed as well as the present engine speed. A driver pedal position demand from the driver may also be taken into account when predicting the variations in engine speed 406 between N0 and N1. Hereby, an extrapolation of a function containing these parameters may be executed for predicting the engine speed at the second point in time, which second point in time, in this example, is between N0 and N1.

The long term prediction horizon between N2 and N3 can relate to slow dynamics of the engine speed that is predicted to take place in a more distant future point in time compared to the short term prediction horizon. The variations in engine speed 408 between N2 and N3 can be predicted from systems obtaining road ahead of the vehicle. Such system may comprise e.g. a digital map or a vision system, etc.

The MPC solver of either the engine controller 202 or the engine and EATS coordinator 304 can use both of the above described short term prediction horizon long term prediction horizon as input when executing the optimization algorithm.

Figure 5:
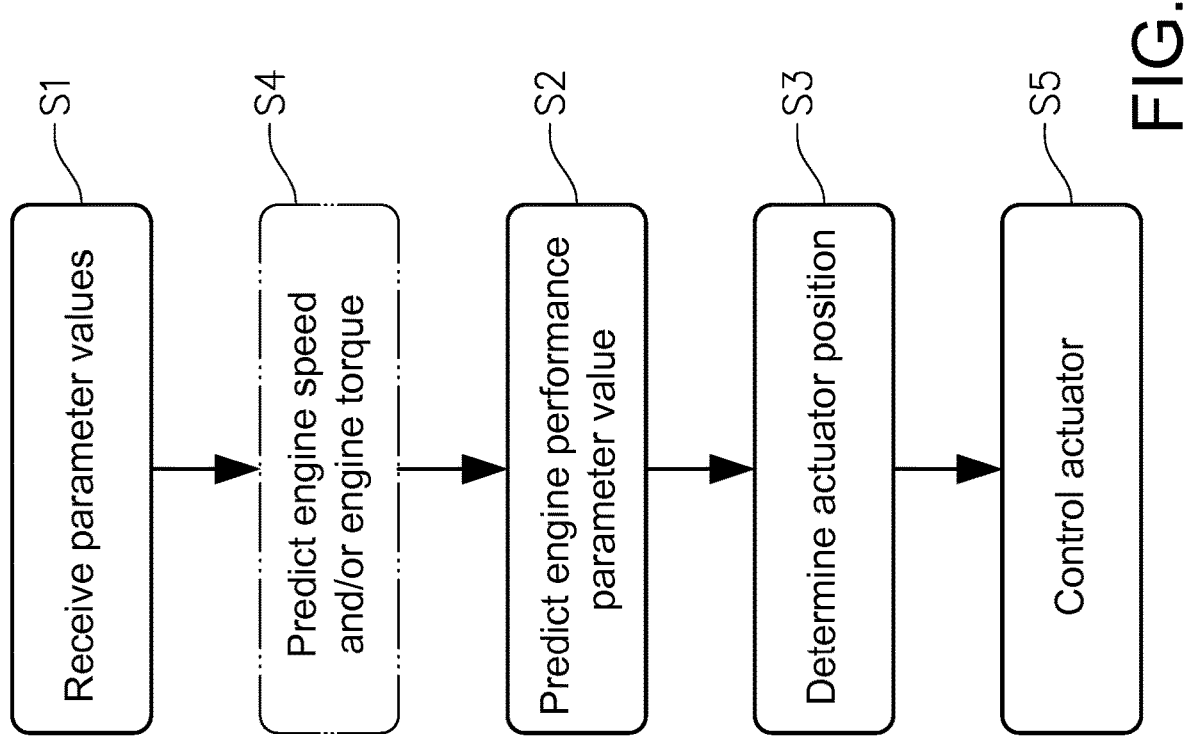
FIG. 5 is a flow chart of a method according to an example embodiment of the present invention.

Finally, in order to summarize the above description and also for detailing the method for determining a position of the at least one actuator, reference is made to FIG. 5. Firstly, parameter values for engine performance parameters are received S1 at a first, present point in time. Hereby, a given starting point for the method is provided. Thereafter, at least one engine performance parameter value is predicted S2 at a second, future point in time. Example embodiments of a method step for predicting the at least one engine performance parameter value at the second point in time will be given below. An actuator position for the at least one actuator 204, 206, 207, 306, 308 is thereafter determined S3 by means of an optimization using the parameter values at the first point in time and at the second point in time. The optimization is preferably executed according to the above described embodiments, preferably using the MPC-solver.

The step of predicting S2 the at least one engine performance parameter value can be executed by means of predicting S4 at least one of an engine speed and engine torque at the second, future point in time. Preferably, both of the engine speed and engine torque is predicted at the second point in time. Methods for predicting future engine speed and engine torque are given above and therefore not described further. By means of the prediction of the engine speed and/or engine torque, the at least one engine performance parameter value at the second point in time can be determined.

After the actuator position of the at least one actuator 204, 206, 207, 306, 308 of the vehicle is determined S3, the at least one actuator 204, 206, 207, 306, 308 is controlled S5 accordingly.

It is to be understood that the present invention is not limited to the embodiment described above and illustrated in the drawings; rather, the skilled person will recognize that many changes and modifications may be made within the scope of the appended claims. For example, signals relating to e.g. the status of the engine after-treatment system may be provided to either the third or the first subsystems. Such signal can relate to the present operating temperature of the engine after-treatment system, etc.

The invention claimed is:

1. A method for determining a position of at least one actuator of an internal combustion engine arrangement, the method comprising the steps of:
receiving parameter values for engine performance parameters of the internal combustion engine arrangement at a first point in time;
receiving a signal indicative of an engine torque and/or engine speed at a previous point in time and at the first point in time;
determining a driver pedal position of a driver pedal of the internal combustion engine arrangement,
predicting at least one of the engine torque and/or engine speed at a short-term prediction horizon by means of the received signal and the determined driver pedal position;
receiving a signal indicative of road topology data ahead at a future point in time from a global positioning system (GPS):
predicting the at least one of the engine torque and/or engine speed for the internal combustion engine arrangement at a long-term prediction horizon, by means of the received signal from the GPS as a long-term prediction;
determining parameter values for the engine performance parameters at the short-term prediction horizon and at the long-term prediction horizon of the at least one of the engine torque and/or engine speed;
determining an actuator position for the at least one actuator by means of an optimization of a weighted sum using the parameter values at the first point in time and at the short-term prediction horizon and the long-term prediction horizon as input, the weighted sum being a weighted sum of minimum of fuel consumption and NOx emissions, and maximum of engine thermal power, and
controlling the at least one actuator to be positioned in the determined actuator position at the first point in time.

2. The method according to claim 1, wherein the actuator position of the at least one actuator is associated with at least one of the engine performance parameters.

3. The method according to claim 1, further comprising the steps of:
receiving a signal from an after-treatment system, the signal being indicative of a minimum and/or maximum allowable NOx level for the after-treatment system; and determining parameter values of the engine performance parameters at the short-term prediction horizon and the long-term prediction horizon by using the received signal from the after-treatment system.

4. The method according to claim 1, wherein each of the engine performance parameters is associated with a respective weighting parameter, the method comprising the step of:
determining a respective value for each of the weighting parameters for acquiring a minimization of a weighted sum of the parameter values at the short-term prediction horizon and the long-term prediction horizon.

5. The method according to claim 1, wherein the step of determining the actuator position is executed by means of a dynamic optimization solver.

6. The method according to claim 1, wherein at least one of the parameter values for the engine performance parameters is a parameter correlating to at least one of fuel consumption and NOx emissions of the internal combustion engine arrangement.

7. The method according to claim 5, wherein the dynamic optimization solver is a Model Predictive Control (MPC) solver.

8. A computer comprising a computer program for performing the steps of claim 1 when the computer program is run on the computer.

9. A non-transitory computer readable medium carrying a computer program for performing the steps of claim 1 when the computer program is run on a computer.

10. A system for determining a position of at least one actuator of an internal combustion engine arrangement, the system being configured to
receive parameter values for engine performance parameters of the internal combustion engine arrangement at a first point in time;
receive a signal indicative of an engine torque and/or engine speed at a previous point in time and at the first point in time;
determine a driver pedal position of a driver pedal of the internal combustion engine arrangement;
predict at least one of the engine torque and/or engine speed at a short-term prediction horizon by means of the received signal and the determined driver pedal position;
receiving a signal indicative of road topology data ahead at an at least one second, future point in time from a global positioning system (GPS);
predict the at least one of the engine torque and/or engine speed for the internal combustion engine arrangement at a long-term prediction horizon, by means of the received signal from the GPS;
determine parameter values for the engine performance parameters at the short-term prediction horizon and at the long-term prediction horizon of the at least one of the engine torque and/or engine speed;

determine an actuator position for the at least one actuator by means of an optimization of a weighted sum using the parameter values at the short-term prediction horizon and the long-term prediction horizon as input, the weighted sum being a weighted sum of minimum fuel consumption and NOx emissions, and maximum engine thermal power; and
control the at least one actuator to be positioned in the determined actuator position at the first point in time.

11. The system according to claim 10, further comprising a first subsystem configured to control the at least one actuator of the internal combustion engine arrangement.

12. The system according to claim 11, further comprising a second subsystem configured to control at least one actuator of an engine after-treatment system, and a third subsystem configured to predict the at least one of the engine torque and/or engine speed of the internal combustion engine arrangement at the short-term prediction horizon and the long-term prediction horizon, wherein the first subsystem is further configured to:
receive the predicted engine torque and/or engine speed at the short-term prediction horizon and the long-term prediction horizon from the third subsystem; and
determine parameter values for the engine performance parameters at the short-term prediction horizon and the long-term prediction horizon by using the prediction of the at least one of the engine torque and/or engine speed received from the third subsystem.

13. The system according to claim 11, further comprising a second subsystem configured to control at least one actuator of an engine after-treatment system, and a third subsystem configured to predict the at least one of the engine torque and/or engine speed of the internal combustion engine arrangement at the short-term prediction horizon and the long-term prediction horizon, wherein the second subsystem is configured to:
receive a signal indicative of a temperature level of an engine after-treatment system at the first point in time; and
provide the signal indicative of the temperature level to the third subsystem.

14. The system according to claim 10, further comprising a subsystem configured to control at least one actuator of an engine after-treatment system.

15. The system according to claim 10, further comprising a subsystem configured to predict the at least one of the engine torque and/or engine speed of the internal combustion engine arrangement at the short-term prediction horizon and the long-term prediction horizon.

16. A vehicle comprising the system according to claim 10.

* * * * *